(12) United States Patent
Yuge (10) Patent No.: US 10,326,137 B2
(45) Date of Patent: Jun. 18, 2019

(54) NEGATIVE ELECTRODE ACTIVE MATERIAL FOR A LITHIUM ION SECONDARY BATTERY AND PRODUCTION METHOD FOR SAME, AND NEGATIVE ELECTRODE AND LITHIUM ION SECONDARY BATTERY

(71) Applicant: NEC Corporation, Tokyo (JP)

(72) Inventor: Ryota Yuge, Tokyo (JP)

(73) Assignee: NEC CORPORATION, Tokyo (JP)

( * ) Notice: Subject to any disclaimer, the term of this patent is extended or adjusted under 35 U.S.C. 154(b) by 100 days.

(21) Appl. No.: 15/511,448

(22) PCT Filed: Sep. 8, 2015

(86) PCT No.: PCT/JP2015/075468
§ 371 (c)(1),
(2) Date: Mar. 15, 2017

(87) PCT Pub. No.: WO2016/052098
PCT Pub. Date: Apr. 7, 2016

(65) Prior Publication Data
US 2017/0301917 A1    Oct. 19, 2017

(30) Foreign Application Priority Data

Sep. 30, 2014 (JP) ................. 2014-199732

(51) Int. Cl.
*H01M 4/58* (2010.01)
*H01M 4/587* (2010.01)
(Continued)

(52) U.S. Cl.
CPC ............ *H01M 4/587* (2013.01); *C01B 32/20* (2017.08); *H01M 4/0471* (2013.01);
(Continued)

(58) Field of Classification Search
CPC .... H01M 4/597; H01M 4/0471; H01M 4/133; H01M 4/625; H01M 4/366; H01M 10/0525; C01B 32/20
(Continued)

(56) References Cited

U.S. PATENT DOCUMENTS 9,005,816 B2*  4/2015  Amine .................. H01M 12/08
429/231.7
2012/0301387 A1* 11/2012 Neumann ............... C03B 19/14
423/445 R
(Continued)

FOREIGN PATENT DOCUMENTS

JP    H07-230803 A    8/1995
JP    H10-297912 A    11/1998
(Continued)

OTHER PUBLICATIONS

Machine translation of JP 2000-021454 (no date).*
(Continued)

*Primary Examiner* — Amanda C. Walke
(74) *Attorney, Agent, or Firm* — Wilmer Cutler Pickering Hale and Dorr LLP (57) ABSTRACT

A negative electrode active material for a lithium ion secondary battery, the negative electrode active material including a porous carbon, wherein, in the porous carbon, a pore having a diameter of 20 nm to 1 μm is formed in the surface of a carbon matrix and a nanopore communicating with the pore and having a diameter of 15 nm or smaller is formed inside the carbon matrix.

13 Claims, 5 Drawing Sheets

(51) Int. Cl.
| | |
|---|---|
| H01M 4/133 | (2010.01) |
| H01M 4/04 | (2006.01) |
| H01M 10/0525 | (2010.01) |
| H01M 4/62 | (2006.01) |
| C01B 32/20 | (2017.01) |
| H01M 4/02 | (2006.01) |
| H01M 4/36 | (2006.01) |

(52) U.S. Cl.
CPC ........... H01M 4/133 (2013.01); H01M 4/625 (2013.01); H01M 10/0525 (2013.01); H01M 4/366 (2013.01); H01M 2004/027 (2013.01); Y02T 10/7011 (2013.01)

(58) Field of Classification Search
USPC .......................................... 429/231.18, 231.8
See application file for complete search history.

(56) References Cited

U.S. PATENT DOCUMENTS

| | | | | |
|---|---|---|---|---|
| 2013/0220817 | A1* | 8/2013 | Walker | H01M 4/0402 205/59 |
| 2014/0141334 | A1* | 5/2014 | Yoo | C01G 1/02 429/222 |
| 2015/0017555 | A1* | 1/2015 | Schuth | B01J 37/084 429/405 |
| 2015/0050583 | A1* | 2/2015 | Schuth | B01J 37/084 429/524 |
| 2016/0104882 | A1* | 4/2016 | Yushin | H01M 4/386 429/218.1 |
| 2017/0141405 | A1* | 5/2017 | Neumann | B01J 37/06 |

FOREIGN PATENT DOCUMENTS

| | | |
|---|---|---|
| JP | 2000-021454 A | 1/2000 |
| JP | 2001-278607 A | 10/2001 |
| JP | 2001-287906 A | 10/2001 |
| JP | 2003-100284 A | 4/2003 |
| JP | 2007-250469 A | 9/2007 |
| JP | 2009-231113 A | 10/2009 |
| JP | 2011-166070 A | 8/2011 |
| JP | 2011-204903 A | 10/2011 |
| JP | 2012-164638 A | 8/2012 |
| JP | 2013-041806 A | 2/2013 |

OTHER PUBLICATIONS

Machine translation of JP 2003-100284 (no date).*
Machine translation of JP 2011-204903 (no date).*
International Search Report corresponding to PCT/JP2015/075468 dated Nov. 10, 2015 (2 pages).
T. Yoshitake, et al., Preparation of fine platinum catalyst supported on single-wall carbon nanohorns for fuel cell application; Physica B 323 (2002) pp. 124-126.

* cited by examiner

(b) Porous carbon C (a) Porous carbon A

NEGATIVE ELECTRODE ACTIVE MATERIAL FOR A LITHIUM ION SECONDARY BATTERY AND PRODUCTION METHOD FOR SAME, AND NEGATIVE ELECTRODE AND LITHIUM ION SECONDARY BATTERY

CROSS-REFERENCE TO RELATED APPLICATIONS

This application is a national stage application of International Application No. PCT/JP2015/075468 entitled "Negative Electrode Active Material for a Lithium Ion Secondary Battery and Production Method for Same, and Negative Electrode and Lithium Ion Secondary Battery" filed on Sep. 8, 2015, which claims priority to Japanese Application No. 2014-199732 filed on Sep. 30, 2014, the disclosures of which are hereby incorporated by reference in their entirety.

TECHNICAL FIELD

The present invention relates to a negative electrode active material for a lithium ion battery and a production method for the same, and a negative electrode and a lithium ion secondary battery.

BACKGROUND ART

Lithium ion secondary batteries have excellent properties such as high energy density, high operation voltage and small degradation after charge/discharge cycles, and thus are widely used for portable information terminals such as cellular phones and laptop computers, and in recent years, further used for storage batteries for electric vehicles and stationary storage batteries (storage batteries for power storage). For these portable information terminals, storage batteries for electric vehicles, and stationary storage batteries, a lithium ion battery having a high capacity and being capable of high-speed charging/discharging is required.

Regarding achievement of a higher capacity, Si-based and Sn-based negative electrode materials, which have high capacity per unit weight, are considered to be promising as an alternative negative electrode material to graphite materials, and in particular Si-based negative electrode materials are advantageous also in terms of cost reduction in the future because the resource is abundant. However, such negative electrode materials suffer from difficulty in achieving high-speed charging/discharging due to low conductivity, and have problems such as a large volume variation after repeated charging/discharging.

Regarding improvement of the high-speed charging/discharging characteristics, use of a carbon material excellent in rate characteristics such as graphitizable carbon and non-graphitizable carbon for a negative electrode active material in place of graphite materials has been proposed. However, such materials have a problem of larger lowering of capacity than in the case of graphite materials when being used for a negative electrode active material.

In addition, lowering of the resistance in an electrode with a conductive aid or the like is examined to improve the high-speed charging/discharging characteristics. Examples of conductive aids include acetylene black, Ketjen black, furnace black, carbon fibers, and carbon nanotubes.

Patent Literature 1 (JP07-230803A) discloses a non-graphitizable carbon in which the pore inlet size in the surface of a fine particle is a size such that a lithium ion in an electrolytic solution of a lithium secondary battery can pass through the pore and an organic solvent in an electrolytic solution cannot pass through the pore substantially, for the purpose of enhancing the capacity of a lithium ion secondary battery.

Patent Literature 2 (JP2007-250469A) discloses a negative electrode active material including amorphous carbon having a three-dimensionally interconnected through-hole with an average through-width of 0.05 to 5 μm and a lithium ion secondary battery using it, for the purpose of providing a negative electrode active material having an excellent occluding/releasing capacity for ions.

Patent Literature 3 (JP2012-164638A) discloses a lithium ion battery using a negative electrode, the negative electrode including: a negative electrode layer containing an active material including an amorphous carbon particle capable of occluding and releasing a lithium ion; and a binder, and including a pore having a pore size of 1 nm or larger and 3 nm or smaller and a pore having a pore size of 20 nm or larger and 100 nm or smaller at a specific ration, for the purpose of enhancing the power.

Non Patent Literature 1 discloses a catalyst with a platinum particle homogeneously dispersed and supported on a single-wall carbon nanohorn, and describes application thereof to an electrode for polymer electrolyte fuel batteries.

CITATION LIST

Patent Literature

Patent Literature 1: JP07-230803A
Patent Literature 2: JP2007-250469A
Patent Literature 3: JP2012-164638A

Non Patent Literature

Non Patent Literature 1: T. Yoshitake, Y. Shimakawa, S. Kuroshima, H. Kimura, T. Ichihashi, Y. Kubo, D. Kasuya, K. Takahashi, F. Kokai, M. Yudasaka, S. Iijima, Physica B 323 (2002) p. 124-126

SUMMARY OF INVENTION

Technical Problem

If a graphite material is used for a negative electrode material of a lithium ion secondary battery, it is difficult to achieve a high capacity and high-speed charging/discharging characteristics in combination.

An object of the present invention is to provide a negative electrode active material allowing for achieving a lithium ion secondary battery having a high charging/discharging capacity and satisfactory high-speed charging/discharging characteristics.

Solution to Problem

One aspect of the present invention provides a negative electrode active material for a lithium ion secondary battery, the negative electrode active material including a porous carbon, wherein, in the porous carbon, a pore having a diameter of 20 nm to 1 μm is formed in the surface of a carbon matrix and a nanopore communicating with the pore and having a diameter of 15 nm or smaller is formed inside the carbon matrix.

Another aspect of the present invention provides a negative electrode for a lithium ion secondary battery, the negative electrode including the above negative electrode active material.

Another aspect of the present invention provides a lithium ion secondary battery including the above negative electrode.

Another aspect of the present invention provides a production method for the above negative electrode active material, including:

allowing the surface of a carbon material to support a metal fine particle of at least one metal selected from the group consisting of copper, mercury, silver, platinum, and gold;

heat-treating in an oxygen-containing atmosphere for combustion of only a portion of the carbon material near the metal fine particle (a portion of the carbon material around the metal fine particle) to form a pore in the surface side and a nanopore communicating with the pore in the internal portion; and dissolving the metal fine particle in a remover for removal of the metal fine particle after formation of the pore in the surface side and the nanopore.

Advantageous Effects of Invention

An exemplary embodiment can provide a negative electrode active material allowing for achieving a lithium ion secondary battery having a high charging/discharging capacity and satisfactory high-speed charging/discharging characteristics.

BRIEF DESCRIPTION OF DRAWINGS

FIG. 3(a): a porous carbon A; and FIG. 3(b): a porous carbon C.

DESCRIPTION OF EMBODIMENTS

A negative electrode active material for a lithium ion secondary battery according to an exemplary embodiment includes a porous carbon, wherein, in the porous carbon, a pore having a diameter of 20 nm to 1 μm is formed in the surface of a carbon matrix and a nanopore communicating with the pore and having a diameter of 15 nm or smaller is formed inside the carbon matrix.

For the carbon matrix, amorphous carbon, non-graphitizable carbon, or graphitizable carbon may be used. The carbon matrix preferably includes graphitizable carbon.

The negative electrode active material may contain 1% by mass or less of at least one metal selected from the group consisting of copper, mercury, silver, platinum, and gold.

It is preferred that the surface of the negative electrode active material be partly or entirely coated with a carbon coating film, and the carbon coating film is preferably a film formed by burning an organic substance at 500 to 1800° C. for carbonization or a film formed by using chemical vapor deposition with a carbon source at 500 to 1800° C. The carbon source is preferably at least one selected from hydrocarbons, alcohols, and CO, and it is more preferred to use at least one selected from methane, ethane, ethylene, acetylene, benzene, toluene, xylene, methanol, ethanol, and CO.

A negative electrode for a lithium ion secondary battery according to another exemplary embodiment contains the above negative electrode active material. Preferably, the negative electrode further contains a carbonaceous conductive aid. The carbonaceous conductive aid is preferably at least one selected from the group consisting of carbon black, acetylene black, Ketjen black, furnace black, activated carbon, carbon nanotubes, carbon nanofibers, carbon nanohorns, and graphene.

Lithium ion secondary batteries using the above negative electrode active material for a negative electrode have a high charging/discharging capacity and satisfactory high-speed charging/discharging characteristics.

A production method for the above negative electrode active material includes: a step of allowing the surface of a carbon material, which is to serve as a carbon matrix, to support a metal fine particle of at least one metal selected from the group consisting of copper, mercury, silver, platinum, and gold; a step of heat-treating in an oxygen-containing atmosphere for combustion of only a portion of the carbon material near the metal fine particle (a portion of the carbon material around the metal fine particle) to form a pore in the surface side and a nanopore communicating with the pore in the internal portion; and a step of dissolving the metal fine particle in a remover for removal of the metal fine particle after formation of the pore in the surface side and the nanopore.

In the production method, the carbon material such as graphitizable carbon supporting the metal fine particle such as copper, mercury, silver, platinum, and gold has an oxidation-susceptible portion around the metal fine particle, and for this reason the periphery of the metal fine particle is preferentially oxidized in oxidation treatment. Specifically, oxidation proceeds from the surface portion supporting the metal fine particle to the internal portion to form a pore. In particular, a fine particle of a noble metal such as platinum and gold is hardly deactivated due to its resistance to oxidation, and thus a pore can be continuously formed from the graphite surface to the internal portion. Since this pore formation is based on reaction of oxygen, a metal, and carbon, the oxygen concentration decreases inside the carbon material, and thus the activity decreases and the pore diminishes in size.

The porous carbon obtained in this manner allows an electrolytic solution and an Li ion to easily move even into or out of the internal portion of the porous carbon, which enables high-speed charging/discharging of a lithium ion secondary battery using the porous carbon for a negative electrode. In addition, the nanopore formed can further incorporate an Li ion, which enables achievement of a higher capacity.

Moreover, the metal fine particle of a noble metal or the like after oxidation treatment can be easily dissolved and removed with a remover such as aqua regia in the method for forming such a porous carbon, and the metal included in the metal fine particle can be easily recovered. In the case that a fine particle of a noble metal is used, in particular, the noble metal can be reused, which facilitates cost reduction.

The porous carbon formed in this manner can be partly or entirely coated with a carbon coating film to protect the graphite edge, a reaction site for an Li ion and an electrolytic solution, with the carbon coating film, and thus lithium ion secondary batteries using the porous carbon for a negative electrode are expected to have improved cycle characteristics. In addition, formation of a carbon coating film can enhance the conductivity of the porous carbon.

An exemplary embodiment will be described in the following.

(Porous carbon/negative electrode active material)

The diameter of the pore in the surface of the porous carbon (the pore formed in the surface of the carbon matrix) according to an exemplary embodiment is in the range of 20 nm to 1 μm, and is more preferably in the range of 20 nm to 500 nm.

The diameter of the pore in the surface of the porous carbon refers to the maximum length of the opening portion in the surface side of the pore (maximum opening size), and corresponds to the diameter of the smallest circle allowing the outline of an opening to fit therein. From the viewpoint of achieving a sufficient effect of pore formation, it is preferred that the opening size corresponding to the diameter of the largest circle which can be present inside the outline of the opening (minimum opening size) also be in the range of 20 nm to 1 μm. These opening sizes can be observed by using an electron microscope such as an SEM.

The porous carbon includes a nanopore communicating with the pore in the surface and having a diameter of 15 nm or smaller in the internal portion. From the viewpoint of achieving a sufficient effect of formation, the diameter of the nanopore is preferably 1 nm or larger, and more preferably 2 nm or larger.

If the metal fine particle penetrates the carbon matrix in forming the nanopore, the porous carbon formed can include the pore (including the nanopore) having a depth comparable to the diameter of the porous carbon (corresponding to the diameter of the carbon matrix). From the viewpoint of the density of the porous carbon, however, the pore including the nanopore may have a depth comparable to the radius of the porous carbon (corresponding to the radius of the carbon matrix). Accordingly, the depth of the pore including the nanopore is preferably 30% or more of the diameter of the porous carbon (corresponding to the diameter of the carbon matrix), and more preferably 40% or more of the diameter of the porous carbon from the viewpoint of the effect of nanopore formation, and is preferably 70% or less of the diameter of the porous carbon, and more preferably 60% or less of the diameter of the porous carbon from the viewpoint of the density of the porous carbon.

For such a porous carbon, the pore volume for a pore diameter in the range of 10 nm to 1000 nm as determined by using a BJH (Barrett, Joyner, Hallender) method may be set in the range of 0.05 to 0.5 $cm^3/g$.

The pore in the surface and the nanopore in the internal portion included in the porous carbon form edges of many holes and the inner space of holes in the graphene sheet structure. The edges and the internal portion of the pore each serve as an adsorption site for an Li ion, and the capacity increases because the number of adsorption sites for a Li ion increases. Diffusion of a Li ion through the holes into the internal portion of the matrix and diffusion of an Li ion between the graphene sheet layers are facilitated, which allows for achievement of satisfactory high-speed charging/discharging characteristics. In the case that the porous carbon is coated with carbon, irreversible reaction between a Li ion and a functional group on the edges is prevented, and thus lowering of the capacity retention can be reduced.

For the porous carbon (negative electrode active material) according to the exemplary embodiment, a particulate porous carbon may be used from the viewpoint of packing efficiency, easiness in mixing, formability, etc. Examples of the shape of the particle include a sphere, an ellipsoid, and a scale. A common spheroidization treatment may be performed.

If the average particle size of the porous carbon is excessively small, the cycle characteristics are degraded due to increase of the reactivity with an electrolytic solution, and thus the average particle size of the porous carbon is preferably 1 μm or larger, and more preferably 5 μm or larger; and preferably 100 μm or smaller, and more preferably 70 μm or smaller from the viewpoint of the packing rate (achievement of a higher density) and electrode fabrication (the smoothness of an electrode surface, etc.). Here, the average particle size refers to a particle size at 50% as a cumulative value (median diameter: $D_{50}$) in a grain size distribution (volume-based) obtained by using a laser diffraction/scattering method.

The BET specific surface area (measured with a nitrogen absorption method at 77 K) of the porous carbon is preferably smaller than 300 $m^2/g$, and more preferably 200 $m^2/g$ or smaller from the viewpoint of the volume density. From the viewpoint of adsorption and diffusion of a Li ion due to pore formation, on the other hand, the BET specific surface area of the porous carbon is preferably 25 $m^2/g$ or larger, and more preferably 30 $m^2/g$ or larger.

Figure 1:
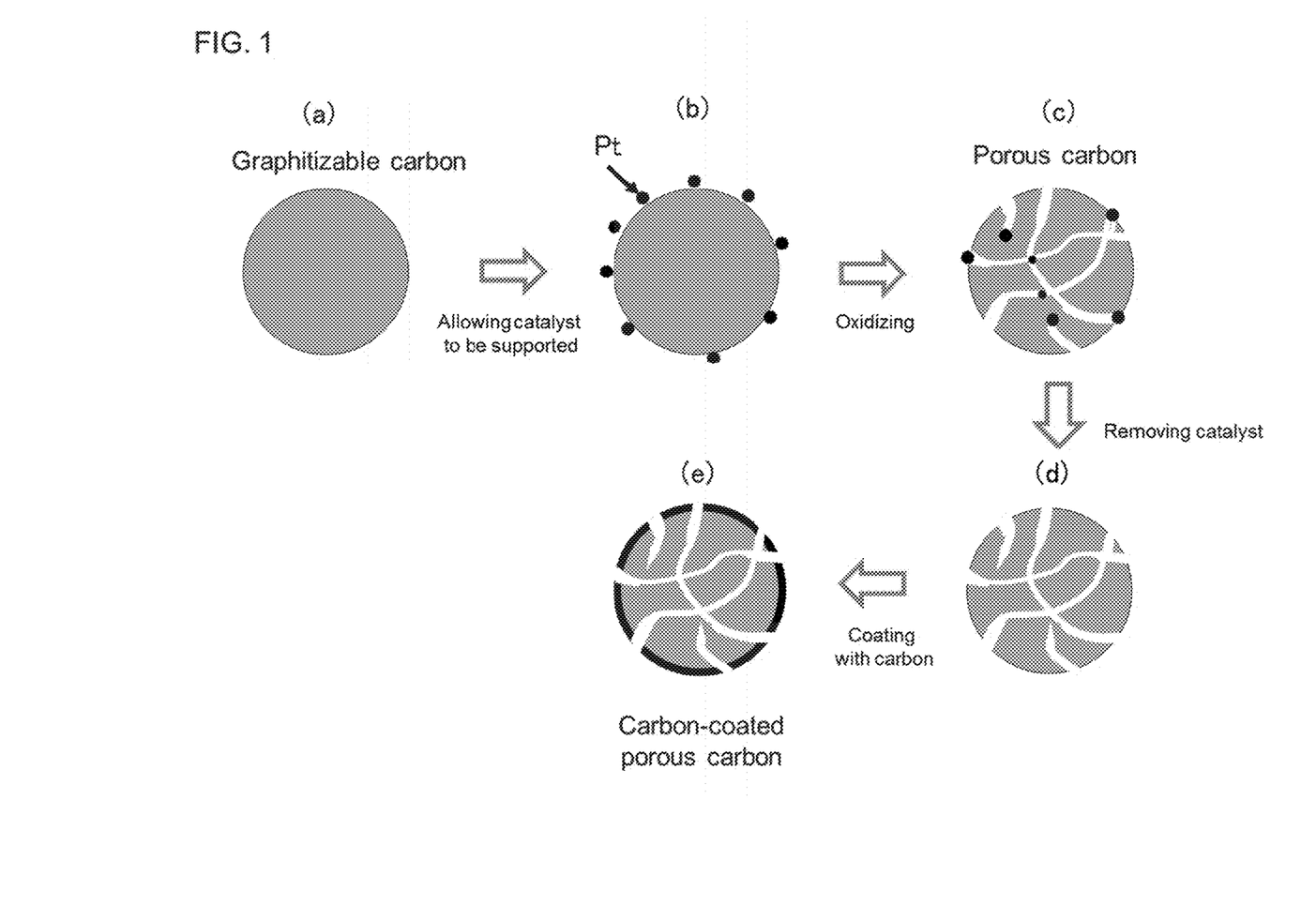
FIG. 1 is a schematic illustrating a formation process for a porous carbon according to an exemplary embodiment.

FIG. 1 is a schematic illustrating a formation process for a porous carbon according to an exemplary embodiment.

First, a carbon material (graphitizable carbon) (FIG. 1(a)) is prepared as a material for the matrix, and the surface is allowed to support platinum (Pt) in accordance with a common treatment method for allowing for supporting a catalyst. For example, platinum is allowed to form a fine particle on the surface of the carbon material in a liquid phase with the carbon material dispersed therein, and thus a Pt particle can be supported (FIG. 1(b)). Solid-liquid separation is performed followed by drying to obtain a carbon sample on which a Pt particle is supported.

Subsequently, the carbon sample on which a Pt particle is supported is heat-treated in air at 480° C., by which only a portion of the carbon material near the Pt particle (a portion of the carbon material around the Pt particle) can be combusted. As the combustion of the carbon material near the Pt particle progresses, the Pt particle moves from the surface of the carbon material to the internal portion, the carbon material near the Pt particle locally combusts sequentially from the surface to the internal portion, and as a result a pore is formed (FIG. 1(c)). Then, the supply of oxygen decreases as the depth increases, and thus the reaction rate decreases and the pore diminishes in size. After the heat treatment, the carbon sample is dispersed in aqua regia to elute the Pt particle, and thus Pt can be removed (FIG. 1(d)). Solid-liquid separation is performed followed by drying to obtain a porous carbon (A).

Thereafter, the porous carbon (A) is heat-treated in an inert gas at 1000° C. (porous carbon B), and carbon coating is then performed at 800° C. to obtain a porous carbon (C) coated with a carbon coating film (FIG. 1(e)).

For the carbon material to be used as the matrix, amorphous carbon may be used, and for the amorphous carbon, graphitizable carbon, non-graphitizable carbon, or another type of amorphous carbon may be used. Among them, graphitizable carbon is preferred from the viewpoint of durability, cost, etc. Graphitizable carbon and non-graphitizable carbon can be obtained by heating an organic substance (precursor) in an inert atmosphere. The graphitizable carbon obtained is easily graphitized in heat treatment, and is thus a carbon material which can be converted to graphite. On the other hand, the non-graphitizable carbon is poorly graphitized in heat treatment, and is thus a carbon material which cannot be converted to graphite at temperatures at which graphitizable carbon is converted to graphite. Examples of precursors (raw materials) of graphitizable carbon include oil raw materials such as petroleum pitch, coal pitch, and low-molecular-weight heavy oils, and mesophase pitch obtained by heat-treating them at around 400° C.

For the carbon material to serve as the matrix in the exemplary embodiment, a particulate carbon material may be used from the viewpoint of the packing efficiency, easiness in mixing, formability, etc., of a porous carbon formed with the carbon material. Examples of the shape of the particle include a sphere, an ellipsoid, and a scale. A common spheroidization treatment may be performed.

If the average particle size of the carbon material is excessively small, the cycle characteristics are degraded due to increase of the reactivity with an electrolytic solution, and thus the average particle size of the carbon material is preferably 1 µm or larger, and more preferably 5 µm or larger; and preferably 100 µm or smaller, and more preferably 70 µm or smaller from the viewpoint of the packing rate (achievement of a higher density) and electrode fabrication (the smoothness of an electrode surface, etc.). Here, the average particle size refers to a particle size at 50% as a cumulative value (median diameter: $D_{50}$) in a grain size distribution (volume-based) obtained by using a laser diffraction/scattering method.

The size of the carbon material is preferably in the range of 1 to 100 µm as an average particle size, and the minimum particle size (diameter) is preferably 1 µm or larger, and more preferably 5 µm or larger, and the maximum particle size (diameter) is preferably 100 µm or smaller, and more preferably 70 µm or smaller.

For the metal to be supported on the surface of the carbon material such as graphitizable carbon, at least one or two or more selected from copper, mercury, silver, platinum, and gold may be used. Among them, gold and platinum are preferred because they are hardly oxidized in the course of oxidation treatment and the activity is not lowered, and platinum is more preferred from the viewpoint of raw material cost. The size (particle size: diameter) of the metal supported on the surface of the carbon material is preferably 20 nm or smaller, more preferably 10 nm or smaller, and even more preferably 2 nm or smaller. The size of the metal is only required to be microscopic so that a pore having a diameter of 20 nm to 1 µm is formed in the surface of the carbon matrix and a nanopore communicating with the pore and having a diameter of 15 nm or smaller is formed inside the matrix. The metal supported on the surface of the carbon material may include a metal particle having a diameter of, for example, 0.5 nm to 20 nm. The size of the metal can be measured in an SEM image.

The quantity of the metal supported is preferably in the range of 0.1 to 10% by mass, and more preferably in the range of 0.1 to 5% by mass based on the quantity of the carbon material (matrix) from the viewpoint of formation of a fine particle. The quantity of the metal supported can be measured by using atomic absorption spectrometry.

Supporting of the metal on the carbon material can be achieved through a solution process. Examples of supporting methods by using such solution process include a colloidal method reported in Non Patent Literature 1.

Another example of supporting methods by using a solution process is an impregnation method in which a solution containing a metal and a carbon material such as graphitizable carbon are mixed together, dispersed, stirred and subjected to impregnation treatment, and thereafter solid-liquid separation is performed with a filter or the like to collect the carbon material. Still another example is a concentration-to-dryness method in which a solution containing a metal and a carbon material are mixed together and then the solvent is evaporated.

For the heat treatment to form a hole in the carbon material, a gas phase method may be used. For a gas for an oxidizing atmosphere, the air, oxygen, carbon monoxide, and a mixed gas containing at least one of them may be used. From the viewpoint of cost reduction, heat treatment is preferably performed in the air atmosphere. If a metal fine particle is supported on the carbon material in heat treatment, the catalytic effect allows for combustion at a lower temperature than in the case that a metal fine particle is not supported. From the viewpoint, the heat treatment temperature may be set in the range of 300 to 700° C., and is more preferably in the range of 300 to 600° C. The temperature elevation rate in the heat treatment may be set in the range of 0.1° C./min to 20° C./min, and is preferably 0.5 to 10° C./min, and more preferably 1 to 5° C./min from the viewpoint of control of the combustion reaction. The heat treatment time is preferably 1 hour or longer, and more preferably 3 hours or longer from the viewpoint of sufficient formation of a pore, and is preferably 10 hours or shorter, and more preferably 6 hours or shorter from the viewpoint of energy cost, etc.

The metal after the heat treatment can be removed with a remover capable of dissolving the metal therein. For the remover, aqua regia (orange-red liquid obtained by mixing concentrated hydrochloric acid and concentrated nitric acid at a volume ratio of 3:1) may be used.

The temperature in removing the metal may be appropriately selected in accordance with a remover and the type of the metal, and may be set, for example, in the range of 5 to 100° C. The temperature is preferably in the range of 10 to 80° C., and more preferably in the range of 20 to 70° C. from the viewpoint of the dissolution efficiency of the metal, the handleability of a remover, and energy cost. In the case that a metal having a high solubility in a remover is used, the temperature is suitably around room temperature from the viewpoint of easiness in handling and cost reduction, and may be set, for example, in the range of 5 to 30° C., or in the range of 10 to 25° C. The treatment time may be set in the range of 5 minutes to 5 hours, and is preferably in the range of 20 minutes to 2 hours from the viewpoint of removal efficiency, etc. The content of the metal remaining after removal treatment for the metal is preferably 1% by mass or less, and more preferably 0.1% by mass or less based on the quantity of the carbon material (porous carbon) from the viewpoint of, for example, process cost reduction through reuse of the metal removed.

Examples of methods for forming a carbon coating film on the surface of the porous carbon obtained include chemical vapor deposition (CVD), sputtering, arc vapor deposition, a liquid phase method, a burning method, a ball mill method, and a mechanical-alloying method. Among them, a burning method is preferred from the viewpoint of allowing for formation of a carbon coating film in a simple manner, and CVD is preferred from the viewpoint of easiness in controlling the film-forming temperature and film-forming atmosphere and allowing for formation of a homogeneous carbon coating film.

In a burning method, an organic substance is burned at 500 to 1800° C. in the presence of a porous carbon for carbonization, by which a carbon coating film can be formed on the porous carbon.

In CVD, a carbon source compound is pyrolyzed in the presence of a porous carbon, by which a carbon coating film can be formed on the porous carbon. Examples of the carbon source which can be used include hydrocarbon compounds such as methane, ethane, ethylene, acetylene, benzene, toluene, and xylene; alcohol organic solvents such as methanol and ethanol; and CO. For an atmosphere gas in film-forming by using CVD, an inert gas such as argon and nitrogen or a mixed gas of an inert gas and hydrogen may be used. The film-forming temperature may be set in the range of 500 to 1800° C., or in the range of 400 to 1200° C.

The flow rate of the carbon source and the atmosphere gas in film-forming by using CVD may be set in the range of 1 mL/min to 10 L/min. From the viewpoint of formation of a homogeneous coating film, the flow rate of the carbon source is preferably in the range of 10 mL/min to 500 mL/min, and the flow rate of the atmosphere gas is preferably in the range of 100 mL/min to 1000 mL/min. The pressure in film-forming by using CVD may be set in the range of 10 Torr (1.33 kPa) to 10000 Torr (1.33 MPa), and is preferably 400 Torr (53.33 kPa) to 850 Torr (113.3 kPa).

The thickness of the carbon coating film is preferably in the range of 1 nm to 100 nm, and more preferably in the range of 5 nm to 30 nm. The carbon coating film having a thickness in the above range can impart a sufficient conductivity. In addition, the carbon coating film having a thickness in the above range can reduce lowering of the capacity per unit volume due to the volume expansion caused by the carbon coating film itself. Such a carbon coating film formed can protect the graphite edge, a reaction site for a Li ion and an electrolytic solution, and thus lithium ion secondary batteries using the carbon coating film for a negative electrode are expected to have improved cycle characteristics.

Lithium ion secondary batteries using the porous carbon according to the above-described exemplary embodiment for a negative electrode active material can have a high charging/discharging capacity and satisfactory high-speed charging/discharging characteristics.

A lithium ion secondary battery according to an exemplary embodiment will be described in the following. The lithium ion secondary battery includes a negative electrode including the above porous carbon as an active material; a positive electrode; and an electrolyte.

(Negative Electrode)

The negative electrode in the lithium ion secondary battery according to the exemplary embodiment including the above porous carbon as a negative electrode active material, and use of the negative electrode can provide a lithium ion secondary battery especially having a higher capacity and being capable of satisfactory high-speed charging/discharging.

The negative electrode in the exemplary embodiment can be fabricated, for example, by forming a negative electrode active material layer containing a negative electrode active material including the above porous carbon and a binder on a negative electrode current collector. To the negative electrode active material layer, a conductive aid or another auxiliary agent, or an active material other than the porous carbon may be added, as necessary. The negative electrode active material layer can be formed by using a common slurry-coating method. Specifically, a slurry containing a negative electrode active material, a binder, and a solvent (and an additive such as a conductive aid, as necessary) is prepared, and the slurry is applied onto a negative electrode current collector, dried, and as necessary, pressurized, and thus a negative electrode can be obtained. Examples of methods for applying the negative electrode slurry include a doctor blade method, a die coater method, and a dip-coating method. Alternatively, a negative electrode active material layer is formed in advance, and then a metal thin film is formed as a current collector by using vapor deposition, sputtering, or the like, and thus a negative electrode can be obtained.

The binder for the negative electrode is not limited, and examples thereof include, polyvinylidene fluoride (PVdF), vinylidene fluoride-hexafluoropropylene copolymers, vinylidene fluoride-tetrafluoroethylene copolymers, styrene-butadiene copolymer rubbers (SBR), polytetrafluoroethylene, polypropylene, polyethylene, polyimide, polyamideimide, methyl (meth)acrylate, ethyl (meth)acrylate, butyl (meth)acrylate, (meth)acrylonitrile, isoprene rubbers, butadiene rubbers, and fluororubbers. For the slurry solvent, N-methyl-2-pyrrolidone (NMP) or water may be used. In the case that water is used for the solvent, carboxymethyl cellulose, methyl cellulose, hydroxymethyl cellulose, ethyl cellulose, or polyvinyl alcohol may be further used as a thickener.

The content of the binder for the negative electrode is preferably in the range of 0.1 to 30% by mass, more preferably in the range of 0.5 to 25% by mass, and even more preferably in the range of 1 to 20% by mass based on the quantity of the negative electrode active material from the viewpoint of the binding strength and the energy density, which are in trade-off relation with each other.

Examples of the conductive aid for the negative electrode include carbon black, acetylene black, Ketjen black, furnace black, activated carbon, carbon nanotubes, carbon nanofibers, and graphene. One of these conductive aids may be used singly, or two or more thereof may be used in combination. The content of the conductive aid may be set in the range of 1 to 30% by mass, and is preferably in the range of 1 to 10% by mass based on the quantity of the negative electrode active material.

Although the negative electrode current collector is not limited, the negative electrode current collector is preferably copper, nickel, stainless steel, molybdenum, tungsten, tantalum, or an alloy containing two or more of them from the viewpoint of electrochemical stability. Examples of the shape include a foil, a sheet, and a mesh.

(Positive Electrode)

The positive electrode in the lithium ion secondary battery according to the exemplary embodiment can be fabricated, for example, by preparing a slurry containing a positive electrode active material, a binder, and a solvent (and a conductive aid, as necessary), applying the slurry onto a positive electrode current collector followed by drying and, as necessary, pressurizing to form a positive electrode active material layer on the positive electrode current collector. Alternatively, a thin film for a current collector may be formed after formation of a positive electrode active material layer, as in the case of the negative electrode.

The positive electrode active material is not limited, and for example, a lithium composite oxide or lithium iron phosphate may be used. Examples of the lithium composite oxide include lithium manganate ($LiMn_2O_4$, $Li_2MnO_3$); lithium cobaltate ($LiCoO_2$); lithium nickelate ($LiNiO_2$); compounds in which at least a part of manganese, cobalt, and nickel in these lithium compounds is substituted with another metal element such as aluminum, magnesium, titanium, and zinc; nickel-substituted lithium manganates, in which a part of manganese in lithium manganate is at least substituted with nickel; cobalt-substituted lithium nickelates, in which a part of nickel in lithium nickelate is at least substituted with cobalt; compounds in which a part of manganese in a nickel-substituted lithium manganate is substituted with another metal element (e.g., at least one of aluminum, magnesium, titanium, and zinc); and compounds derived from a cobalt-substituted lithium nickelate in which compounds a part of nickel has been substituted with another metal element (e.g., at least one of aluminum, magnesium, titanium, and zinc). One of these lithium composite oxides may be used singly, or two or more thereof may be used in combination. From the viewpoint of reactivity with an electrolytic solution, rate characteristics, etc., the average particle size of the positive electrode active material to be used is, for example, in the range of 0.1 to 50 µm, more preferably in the range of 1 to 30 µm, and even more preferably in the range of 5 to 25 µm. Here, the average particle size refers to a particle size at 50% as a cumulative value (median diameter: $D_{50}$) in a grain size distribution (volume-based) obtained by using a laser diffraction/scattering method.

The binder for the positive electrode is not limited, and the binders mentioned for the negative electrode may be used. Among them, polyvinylidene fluoride is preferred from the viewpoint of versatility and low cost. The content of the binder for the positive electrode is preferably in the range of 1 to 25% by mass, more preferably in the range of 2 to 20% by mass, and even more preferably 2 to 10% by mass based on the quantity of the positive electrode active material from the viewpoint of the binding strength and the energy density, which are in trade-off relation with each other. Examples of binders other than polyvinylidene fluoride include vinylidene fluoride-hexafluoropropylene copolymers, vinylidene fluoride-tetrafluoroethylene copolymers, polytetrafluoroethylene, polypropylene, polyethylene, polyimide, and polyamideimide. For the slurry solvent, N-methyl-2-pyrrolidone (NMP) may be used.

The positive electrode current collector is not limited, and for example, aluminum, nickel, titanium, tantalum, stainless steel (SUS), another valve metal, or an alloy of them may be used from the viewpoint of electrochemical stability. Examples of the shape include a foil, a sheet, and a mesh. An aluminum foil is particularly suitably used.

A conductive aid may be added in fabrication of the positive electrode for the purpose of lowering of the internal resistance. Examples of the conductive aid include carbon black, acetylene black, Ketjen black, furnace black, activated carbon, carbon nanotubes, carbon nanofibers, and graphene. One of these conductive aids may be used singly, or two or more thereof may be used in combination. The content of the conductive aid may be set in the range of 1 to 30% by mass, and is preferably in the range of 1 to 10% by mass based on the quantity of the positive electrode active material.

(Electrolyte)

For the electrolyte, a non-aqueous electrolytic solution in which a lithium salt is dissolved in one or two or more non-aqueous solvents may be used. The non-aqueous solvent is not limited, and example thereof include cyclic carbonates such as ethylene carbonate (EC), propylene carbonate (PC), butylene carbonate (BC), and vinylene carbonate (VC); linear carbonates such as dimethyl carbonate (DMC), diethyl carbonate (DEC), ethyl methyl carbonate (EMC), and dipropyl carbonate (DPC); aliphatic carboxylates such as methyl formate, methyl acetate, and ethyl propionate; γ-lactones such as γ-butyrolactone; linear ethers such as 1,2-ethoxyethane (DEE) and ethoxymethoxyethane (EME); and cyclic ethers such as tetrahydrofuran and 2-methyltetrahydrofuran. Other examples of the non-aqueous solvent which can be used include aprotic organic solvents such as dimethylsulfoxide, 1,3-dioxolane, dioxolane derivatives, formamide, acetamide, dimethylformamide, acetonitrile, propionitrile, nitromethane, ethyl monoglyme, phosphoric triesters, trimethoxymethane, sulfolane, methylsulfolane, 1,3-dimethyl-2-imidazolidinone, 3-methyl-oxazolidinone, propylene carbonate derivatives, tetrahydrofuran derivatives, ethyl ether, 1,3-propanesultone, anisole, and N-methylpyrrolidone.

The lithium salt to be dissolved in the non-aqueous solvent is not limited, and examples thereof include $LiPF_6$, $LiAsF_6$, $LiAlCl_4$, $LiClO_4$, $LiBF_4$, $LiSbF_6$, $LiCF_3SO_3$, $LiCF_3CO_2$, $Li(CF_3SO_2)_2$, $LiN(CF_3SO_2)_2$, and lithium bis(oxalato)borate. One of these lithium salts may be used singly, or two or more thereof may be used in combination. Alternatively, a polymer electrolyte may be used in place of the non-aqueous electrolytic solution.

(Battery Configuration)

The above positive electrode and negative electrode are disposed in such a way that the respective active material layers are opposite to each other, and the above electrolyte is allowed to fill between them, by which a battery can be configured. Between the positive electrode and the negative electrode, a separator may be further provided. For the separator, a porous film, woven fabric, or nonwoven fabric including polyolefin such as polypropylene and polyethylene, a fluororesin such as polyvinylidene fluoride, or polyimide may be used. These battery elements may be contained in an outer case.

Examples of the battery shape include a cylinder, a rectangle, a coin, a button, and a laminate. In the case of a laminate battery, it is preferred to use a laminate film for an outer case to contain the positive electrode, separator, negative electrode, and electrolyte therein. The laminate film includes a resin base material, a metal foil layer, and a heat-seal layer (sealant). Examples of the resin base material include polyester and polyamide (nylon), and examples of the metal foil layer include an aluminum foil, an aluminum alloy foil, and a titanium foil. Examples of the material of the heat-seal layer include thermoplastic polymer materials such as polyethylene, polypropylene, and polyethylene terephthalate. Each of the resin base material layer and the metal foil layer is not limited to a monolayer configuration, and may be in two or more layers. An aluminum laminate film is preferred from the viewpoint of versatility and cost.

The positive electrode, the negative electrode, and the separator disposed therebetween are housed in an outer package formed of a laminate film or the like, and the electrolytic solution is injected therein and the outer package is sealed. Alternatively, a structure in which an electrode group with a plurality of electrode pairs laminated is contained may be employed.

EXAMPLES

The present invention will be described in more detail with reference to Examples illustrated in the following. The present invention is never limited to the following Examples.

Example 1

Graphitizable carbon (10 g) to serve as a carbon matrix is dispersed in 200 mL of water with chloroplatinic acid (1 g)

added thereto, and the resultant was stirred for 2 hours. The dispersion obtained was filtered, and the solid content separated was dried at 100° C. for 5 hours. Subsequently, the resultant was heated to 580° C. at a temperature elevation rate of 1° C./min in the air.

The carbon material obtained was dispersed in 200 mL of aqua regia, and the resultant was stirred for 3 hours. Thereafter, the dispersion was filtered, and the solid content separated was dried at 100° C. for 5 hours to afford a porous carbon (A).

Example 2

The porous carbon (A) obtained in the same manner as in Example 1 was placed in an alumina boat, and heated to 1000° C. in an argon gas flow (500 mL/min), and burned for 3 hours to afford a porous carbon (B).

Example 3

The porous carbon (A) obtained in the same manner as in Example 1 was placed in an alumina boat, and heated to 1000° C. in an argon gas flow (500 mL/min), and burned for 3 hours, and thereafter the temperature was lowered to 800° C. in an argon flow for stabilization.

Subsequently, 100 mL of ethylene gas was introduced into the argon gas to vapor-deposit carbon for 20 minutes. Thereafter, introduction of ethylene gas was ceased, and the temperature was lowered to around room temperature in the argon to afford a porous carbon (C).

The porous carbon (C) obtained was subjected to thermogravimetric analysis in an oxygen atmosphere in the range of room temperature to 1000° C. It was found that the temperature region of 500 to 650° C. was the combustion region for the coating film, and was found from the weight loss that approximately 2% by mass of a carbon film was present.

(Observation and Analysis of Porous Carbons)

Figure 2:
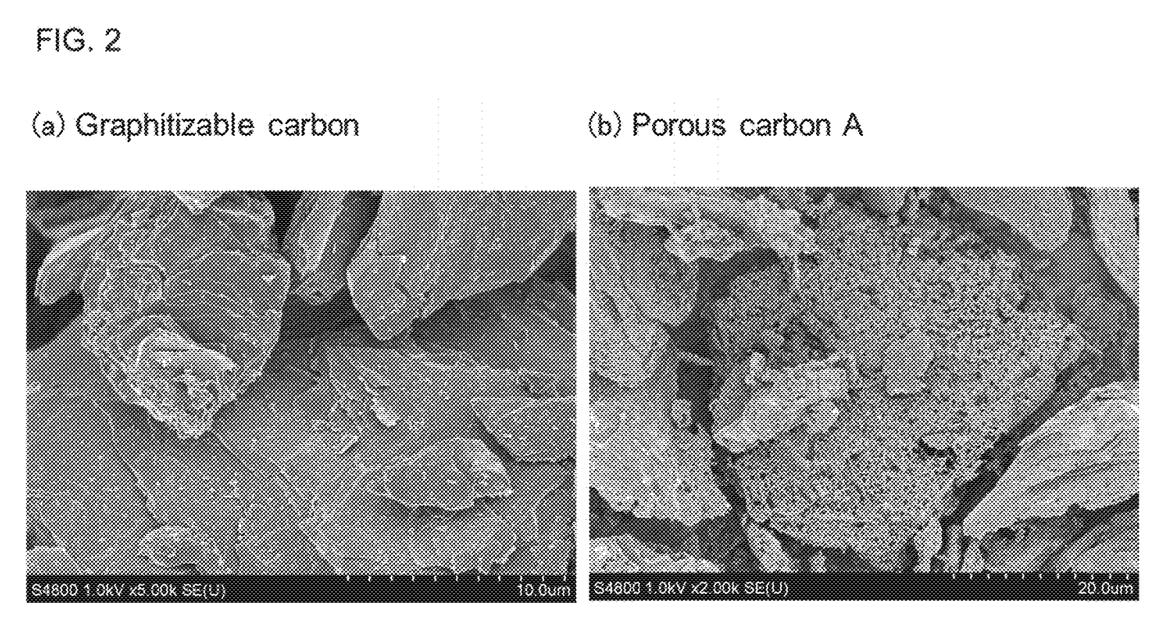
FIGS. 2(a) and 2(b) show scanning electron microscope images of a carbon matrix and a porous carbon according to an exemplary embodiment, respectively.
Figure 3:
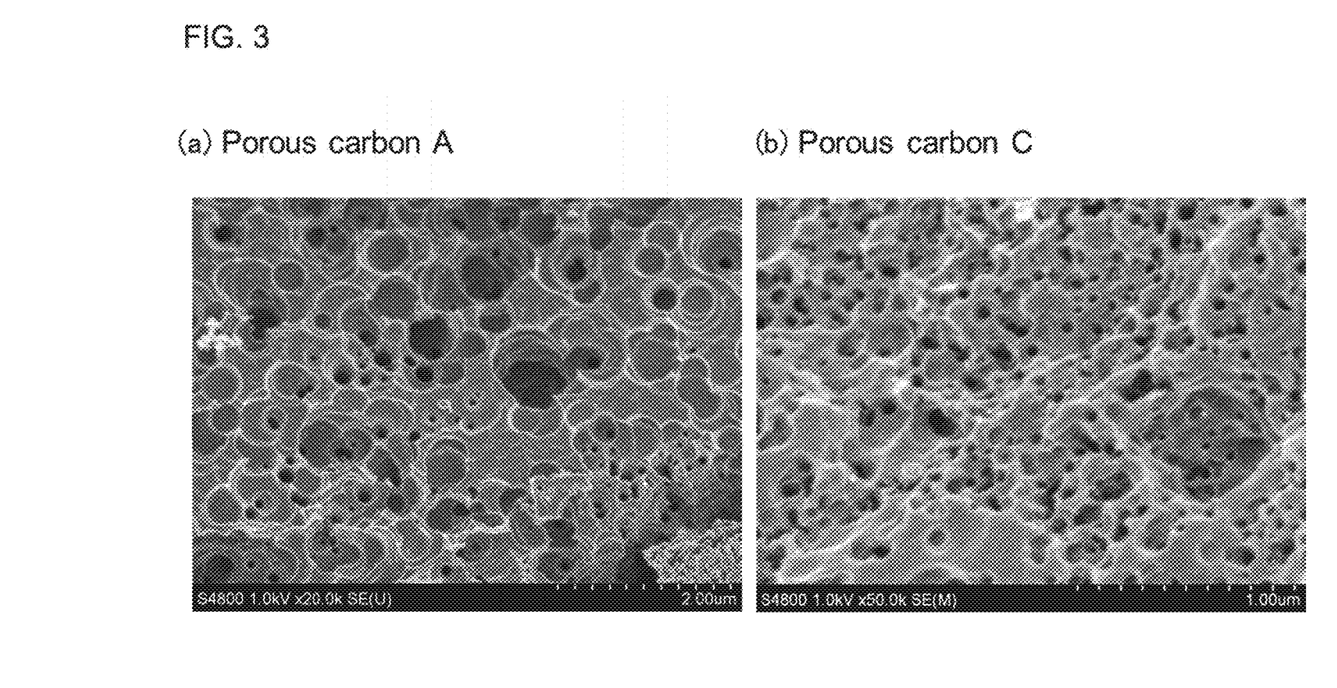
FIGS. 3(a) and 3(b) show scanning electron microscope images of porous carbons according to an exemplary embodiment.

FIG. 2 and FIG. 3 show scanning electron microscope (SEM) images of the carbon material as the raw material and the porous carbons obtained. FIG. 2(a) shows an SEM image of graphitizable carbon. FIG. 2(b), and FIGS. 3(a) and 3(b) show SEM images of the porous carbon A. A pore having a diameter of 20 nm to 1 µm is observed in the surface. It can be seen that a pore opening with only a portion near the surface oxidized and a pore penetrating to the internal portion are present, and a much smaller nanopore (hole) is formed deeper inside.

FIG. 3(b) shows an SEM image of the porous carbon C. The edge of the opening portion of a pore is coated with carbon and smoothed.

Figure 4:
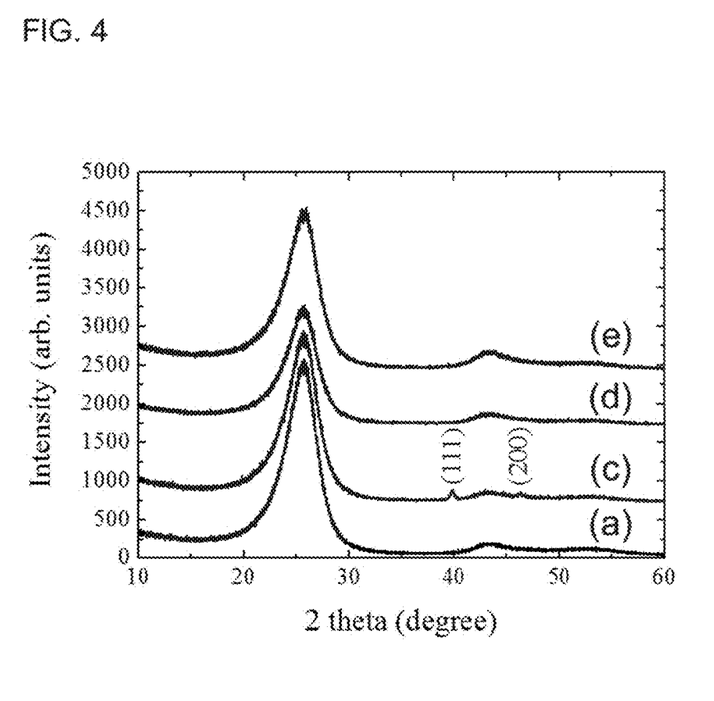
FIG. 4 is a graph showing an X-ray diffraction result for porous carbons according to an exemplary embodiment.

FIG. 4 is a graph showing measurement results of X-ray diffraction (XRD) for the porous carbons obtained: (a) graphitizable carbon; (c) the carbon after the oxidation treatment and before the aqua regia treatment; (d) the porous carbon A; and (e) the porous carbon C.

The peaks at 25.8° in the figure correspond to the diffraction derived from the (002) of graphite, and the linewidth is almost unchanged among them. Accordingly, the interlayer distance of graphite is almost identical among them. This indicates that no platinum was incorporated between the graphene sheet layers and the crystallinity was not lowered due to formation of many defects on the graphene sheets in the course of oxidation of the carbon material. The peaks at 39.8° and 46.3° observed only for (c) correspond to the diffraction derived from the (111) and the (200) of platinum, respectively. These peaks are not observed for (d) and (e), which suggests that washing treatment with aqua regia (for 3 hours) can remove most of the platinum. In the case of washing at room temperature for 60 minutes (in the middle of the washing in Example 1), approximately 0.1% by mass of platinum was remained (measurement by using atomic absorption spectrometry).

(Specific Surface Area)

Figure 5:
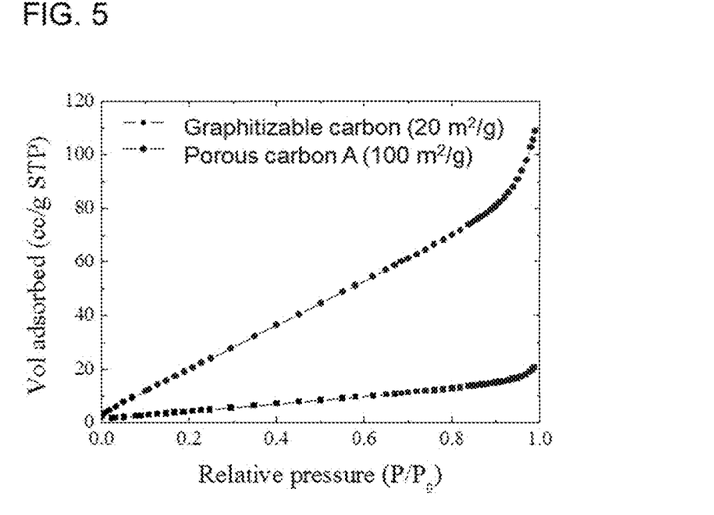
FIG. 5 is a graph showing a nitrogen adsorption isotherm for a porous carbon according to an exemplary embodiment at 77 K.

FIG. 5 is a graph showing nitrogen adsorption isotherms for graphitizable carbon and the porous carbon A at 77 K. The volume adsorbed of the porous carbon A largely increased in comparison with untreated graphitizable carbon, and the specific surface area increased from 20 m$^2$/g to 100 m$^2$/g. This indicates that an adsorption site was formed on the surface of and inside the porous carbon.

(Pore Distribution)

Figure 6:
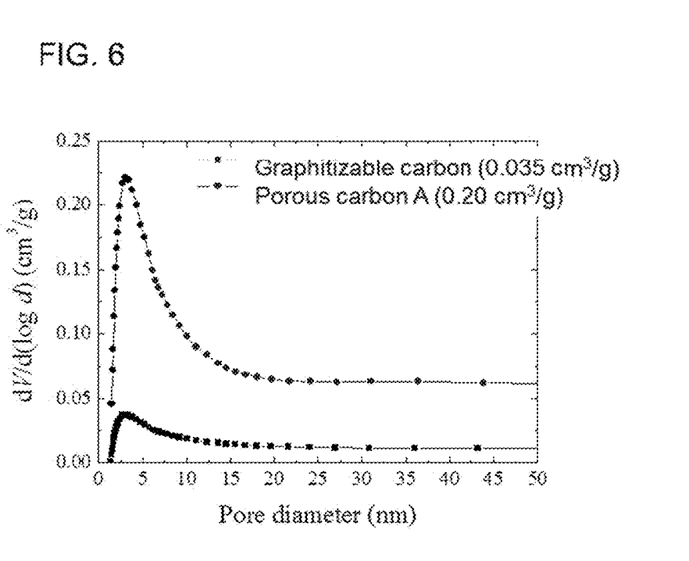
FIG. 6 is a graph showing the pore distribution of a porous carbon according to an exemplary embodiment at 77 K.

FIG. 6 is a graph showing the pore distribution (in accordance with the BJH method) obtained from the adsorption isotherms at 77 K. It was confirmed that a nanopore having a diameter of 15 nm or smaller was formed in the porous carbon A. In addition, the pore volume increased from 0.035 cm$^3$/g to 0.2 cm$^3$/g (10 nm to 1000 nm in terms of a pore diameter).

These results suggest that, in each of the porous carbons obtained, a pore in the surface portion had an opening size (diameter) of 20 nm to 1 µm, and each of the porous carbons included a pore only in the surface portion and a pore penetrating from the surface to the internal portion, and a nanopore having a diameter of 15 nm or smaller was present inside each of the porous carbons.

(Fabrication of Lithium Ion Secondary Battery)

An active material (graphitizable carbon, and the porous carbons A, B, and C) in a quantity of 92% by mass, polyvinylidene fluoride (PVDF) in a quantity of 4% by mass, and a conductive aid in a quantity of 4% by mass were mixed together, and N-methyl-2-pyrrolidinone was further mixed therewith, and the resultant was sufficiently stirred to prepare a negative electrode slurry. The negative electrode slurry was applied in a thickness of 100 µm onto a copper foil with a thickness of 10 µm. Thereafter, the resultant was dried at 120° C. for 1 hour, and then pressed into an electrode by using a roller press. The electrode was further stamped into a size of 2 cm$^2$, and thus a negative electrode was fabricated.

A lithium ion secondary battery (test cell) was fabricated with the negative electrode obtained, an Li foil as a positive electrode, an electrolytic solution and a separator. An electrolytic solution was prepared by dissolving LiPF$_6$ in a mixed solvent of ethylene carbonate and methyl ethyl carbonate (volume ratio: 3:7) to a concentration of 1 M. For the separator, a polyethylene porous film with a thickness of 30 µm was used.

(Evaluation on Charging/Discharging Characteristics)

For the secondary batteries fabricated, charging/discharging characteristics were investigated as in the following. First, a secondary battery was set on a charge/discharge tester, and charged at a constant current of 0.1 mA/cm$^2$ until the voltage reached 0 V, and charged with the state of 0 V maintained while the current was continuously lowered. Then, the charging was terminated when the current value reached 50 µA/cm$^2$. Discharging was performed at a constant current of 0.1 mA/cm$^2$ and terminated when the cell voltage reached 1.5 V, and then the discharging capacity was determined. The discharging capacities determined for graphitizable carbon, and the porous carbons A, B, and C were 220 mAh/g, 250 mAh/g, 250 mAh/g, and 270 mAh/g, respectively (Table 1). Thus, these Examples demonstrated increase of the capacity.

TABLE 1

|  | Comparative Example | Example 1 | Example 2 | Example 3 |
|---|---|---|---|---|
| Negative electrode active material | graphitizable carbon | porous carbon A | porous carbon B | porous carbon C |
| Discharging capacity (mAh/g) | 220 | 250 | 250 | 270 |

(Evaluation on Rate Characteristics and Capacity Retention)

Rate characteristics were evaluated in measurement of charge and discharge at 0.1 C, 0.2 C, 2 C, 5 C, and 10 C. Here, "C rate" refers to a proportion to 1 C rate (unit: C), which is defined as a current value when charging/discharging is performed to a predetermined voltage for 1 hour. In addition, the capacity retention was evaluated after 30 cycles of charging/discharging from 0 V to 1.0 V.

Table 2 shows the capacity retention after 30 cycles and the ratio of the capacity after charging/discharging at each of 2 C, 5 C, and 10 C to the capacity after charging/discharging at 0.1 C. As can be seen from Table 2, the batteries with the porous carbons A, B, and C were superior to the battery with untreated graphitizable carbon at any rate of charging/discharging. For the capacity retention, similarly, each of the batteries with the porous carbons A, B, and C exhibited a higher value than the battery with untreated graphitizable carbon.

These results demonstrated that an exemplary embodiment improves both the high-speed charging/discharging characteristics and the capacity retention of a lithium ion secondary battery. The reason for the high capacity retention of the battery with the porous carbon C is that a carbon coating film protects the edge and prevents the degradation.

TABLE 2

|  |  | Rate characteristics | | | Capacity |
|---|---|---|---|---|---|
|  |  | 2 C/ 0.1 C (%) | 5 C/ 0.1 C (%) | 10 C/ 0.1 C (%) | retention after 30 cycles (%) |
| Graphitizable carbon (Comparative Example) | Discharging | 83 | 70 | 56 | 95 |
|  | Charging | 64 | 37 | 12 |  |
| Porous carbon A (Example 1) | Discharging | 91 | 86 | 82 | 97 |
|  | Charging | 76 | 60 | 40 |  |
| Porous carbon A (Example 2) | Discharging | 91 | 85 | 78 | 97 |
|  | Charging | 75 | 55 | 30 |  |
| Porous carbon A (Example 3) | Discharging | 89 | 81 | 70 | 99 |
|  | Charging | 72 | 50 | 28 |  |

In the foregoing, the present invention has been described with reference to the exemplary embodiments and the Examples; however, the present invention is not limited to the exemplary embodiments and the Examples. Various modifications understandable to those skilled in the art may be made to the constitution and details of the present invention within the scope thereof.

The present application claims the right of priority based on Japanese Patent Application No. 2014-199732 filed on Sep. 30, 2014, the entire of the disclosure of which is incorporated herein.

The invention claimed is:

1. A negative electrode active material for a lithium ion secondary battery, the negative electrode active material comprising a porous carbon, wherein, in the porous carbon, a pore having a diameter of 20 nm to 1 μm is formed in a surface of a carbon matrix and a nanopore communicating with the pore and having a diameter of 15 nm or smaller is formed inside the carbon matrix, and wherein the carbon matrix comprises graphitizable carbon.

2. The negative electrode active material according to claim 1, comprising 1% by mass or less of at least one metal selected from the group consisting of copper, mercury, silver, platinum, and gold.

3. The negative electrode active material according to claim 1, wherein a surface of the porous carbon is partly or entirely coated with a carbon coating film.

4. The negative electrode active material according to claim 1, wherein a diameter of the nanopore is in a range of 2 nm to 15 nm.

5. The negative electrode active material according to claim 1, wherein a diameter of the nanopore is in a range of 2 nm to 15 nm, and a diameter of the pore formed in a surface of the carbon matrix is in a range of 20 nm to 500 nm.

6. A negative electrode for a lithium ion secondary battery, the negative electrode comprising the negative electrode active material according to claim 1.

7. The negative electrode according to claim 6, further comprising a carbonaceous conductive aid.

8. A lithium ion secondary battery comprising the negative electrode according to claim 6.

9. A production method for the negative electrode active material, for a lithium ion secondary battery, the negative electrode active material comprising a porous carbon, wherein, in the porous carbon, a pore having a diameter of 20 nm to 1 μm is formed in a surface of a carbon matrix and a nanopore communicating with the pore and having a diameter of 15 nm or smaller is formed inside the carbon matrix, the method comprising:

allowing a surface of a carbon material to support a metal fine particle of at least one metal selected from the group consisting of copper, mercury, silver, platinum, and gold;

heat-treating in an oxygen-containing atmosphere for combustion of a portion of the carbon material around the metal fine particle to form a pore in a surface side and a nanopore communicating with the pore in an internal portion; and dissolving the metal fine particle in a remover to remove the metal fine particle after formation of the pore in the surface side and the nanopore.

10. The production method according to claim 9, wherein the carbon material is graphitizable carbon.

11. The production method according to claim 9, wherein a content of the metal in the porous carbon after said dissolving the metal fine particle in the remover to remove the metal fine particle is reduced to 1% by mass or less.

12. The production method according to claim 9, further comprising a step of forming a carbon coating film on a surface of the porous carbon partly or entirely.

13. The production method according to claim 12, wherein the carbon coating film is formed by burning an organic substance at 500 to 1800° C. for carbonization, or formed by using chemical vapor deposition with a carbon source at 500 to 1800° C.

* * * * *